United States Patent
Lincoln et al.

(10) Patent No.: US 7,095,444 B1
(45) Date of Patent: Aug. 22, 2006

(54) METHOD AND APPARATUS FOR GENERATING, DISTRIBUTING AND RECONSTRUCTING DECONSTRUCTED VIDEO

(75) Inventors: Patrick D. Lincoln, Woodside, CA (US); David W. J. Stringer-Calvert, Sunnyvale, CA (US); Steven M. Dawson, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 605 days.

(21) Appl. No.: 09/707,044

(22) Filed: Nov. 6, 2000

(51) Int. Cl.
 *H04N 7/12* (2006.01)
 *H04N 11/02* (2006.01)
(52) U.S. Cl. .............. 348/390.1; 375/240.16; 375/240.14
(58) Field of Classification Search ........... 348/169; 375/240, 240.02, 240.25, 133, 140, 148, 375/240.08, 240.11, 240.14; 382/243, 284, 382/240; 370/535, 464; 358/450
See application file for complete search history.

(56) References Cited

U.S. PATENT DOCUMENTS

| | | | | |
|---|---|---|---|---|
| 5,063,603 A | * | 11/1991 | Burt | 382/115 |
| 5,557,684 A | * | 9/1996 | Wang et al. | 382/107 |
| 5,621,660 A | * | 4/1997 | Chaddha et al. | 709/247 |
| 5,821,986 A | * | 10/1998 | Yuan et al. | 348/14.12 |
| 5,896,176 A | * | 4/1999 | Das et al. | 375/240.15 |
| 6,084,912 A | * | 7/2000 | Reitmeier et al. | 375/240.11 |
| 6,233,356 B1 | * | 5/2001 | Haskell et al. | 382/243 |
| 6,301,370 B1 | * | 10/2001 | Steffens et al. | 382/103 |
| 6,392,705 B1 | * | 5/2002 | Chaddha | 348/388.1 |
| 6,477,201 B1 | * | 11/2002 | Wine et al. | 375/240.08 |
| 6,567,427 B1 | * | 5/2003 | Suzuki et al. | 370/535 |
| 6,614,936 B1 | * | 9/2003 | Wu et al. | 382/238 |

OTHER PUBLICATIONS

Shacham et al. "Conducting a Multiparty Multimedia Session over ATM using Hierarchically Encoded Data" Computer Science Laboratory, 1997.
Shacham et al. "HMC: A System for Heterogeneous Multicast over ATM" In Proceedings of INTEROP, 1997.
Sudan et al. "Multicasting Layered Multimedia Streams in an ATM Environment" SRI International, pp. 0-19.

* cited by examiner

*Primary Examiner*—Gims Philippe
*Assistant Examiner*—Erick Rekstad
(74) *Attorney, Agent, or Firm*—Kin-Wah Tong, Esq.; Patterson & Sheridan, LLP

(57) ABSTRACT

A method and apparatus for deconstructing video into a hierarchical structure, distributing the deconstructed video and reconstructing the deconstructed video to form a video signal having characteristics that match the capabilities of a user device. The video stream may be deconstructed using a single dimension deconstruction or a multidimensional deconstruction.

25 Claims, 7 Drawing Sheets

METHOD AND APPARATUS FOR GENERATING, DISTRIBUTING AND RECONSTRUCTING DECONSTRUCTED VIDEO

BACKGROUND OF THE INVENTION

1. Field of the Invention

The invention generally relates to video distribution systems and, more particularly, to video distribution systems that distribute deconstructed video through communications networks.

2. Description of the Background Art

Video transmission through communications networks such as the INTERNET has become ubiquitous. Typically, the video is encoded using a compression algorithm such as MPEG-2 or Quicktime and transmitted as a single compressed bitstream to the user. The user's equipment comprises a plurality of compressed-video decoders that can decode various forms of encoded video. However, if the user's equipment is of a type that has limited computing power, the decoded image sequence may be distorted, or otherwise have poor quality.

One method that is used to match the quality of the encoded imagery to the capabilities of the user equipment is to encode a plurality of bitstreams where each stream represents a different level of image quality. The user then selects a bitstream from the plurality of encoded bitstreams. The quality of the video encoded into the selected bitstream matches the processing power of the user's equipment, i.e., a small hand-held computing device capable of low resolution video presentation would select a low resolution bitstream. As such, the user receives and decodes the selected bitstream in a manner that matches the capabilities of their device.

Such systems require the user to apriori understand the capabilities of their decoder and select an appropriate bitstream. Many times such selection is not possible or it is accomplished by trial and error, i.e., the user repeatedly selects bitstreams until an appropriate one is found. Furthermore, transmitting a plurality of encoded bitstreams where each bitstream comprises a full representation of an image sequence consumes an enormous amount of bandwidth within the communications network and a large amount of storage space on a server.

Therefore, there is a need in the art for a method and apparatus that deconstructs the video in a hierarchical manner, transmits each level of deconstructed video in the hierarchy, and enables user equipment or a network interface device to reconstruct a video stream from select levels of the deconstructed video that is commensurate with the capabilities of the user equipment.

SUMMARY OF THE INVENTION

The present invention provides a method and apparatus for deconstructing a video signal (a sequence of video frames) into a hierarchical structure, distributing the deconstructed video, and reconstructing the video signal such that the video signal quality of the reconstructed video signal matches the capabilities of the user device that is to decode and display the video. To begin the deconstruction process, the video image sequence may be divided into one or more constituent components, i.e., foreground objects are separated from the background, moving objects are separated from the background, faces of people are separated from remaining video, text or graphics are separated from the remaining video, and so on. Of course, the invention does not require the video sequence to be divided into its components parts such that the intact video image sequence can be encoded. The components or the entire video image sequence may be deconstructed using a single dimension deconstruction process or a multidimensional deconstruction process. The single dimension deconstruction process creates a hierarchy along a single characteristic of each component. For example, each component of the video may be deconstructed along a resolution characteristic by producing a first bitstream that is encoded using a low resolution encoder, a second bitstream is created using a slightly higher resolution encoder, and so on. Such deconstruction along a single dimension (e.g., image resolution) is one example of the many dimensions that could be used. Other examples include color depth, frame rate, display type, and the like.

In one embodiment of the invention, multidimensional deconstruction is accomplished by generating a partial order representation of the deconstructed elements for each component of the video signal. Each point in the partial order represents a particular valid combination of encoding parameters. For example, the video image sequence can be processed to extract background from foreground information within the video signal, the background information can be encoded using a plurality of frame rates, while the foreground material can be coded using another plurality of frame rates. Upon reconstruction, the user device may be provided a low frame rate for the background and a high frame rate for the foreground. Additionally, the foreground material can be encoded using a higher resolution than the background material. In fact, many levels of resolution and frame rates can be used and then selectively combined for the user device. As such, the image sequence is deconstructed into components which are each then deconstructed into multiple dimensions.

Each combination of encoding parameters represented by a required set of points in the partial order is encoded into a bitstream for transmission through a network. The separately encoded bitstreams are transmitted from one network interface device (NID) to another through the network. The network may be the INTERNET, cable television network, satellite network, wireless network or a combination of networks. The bitstreams may be pointcast, multicast or broadcast through the network. The protocol used for transmission is any one that is supported by the network. The NID that receives the bitstreams, reconstructs the video signals into a format that can be decoded by the user equipment or, if the NID is an intermediate node in the network, reconstructs the video signals into a format that can be decoded by other "downstream" NIDS. The NID at the edge of a network then transmits the reconstructed stream to the user equipment. The protocol used to propagate the video to the user equipment may be MPEG-2 or some other compression protocol that is suitable for reception by the user equipment.

The edge NID forms a universal translator that resides at the edge of a network and receives the bitstreams from the network in their deconstructed state and reconstructs the video signal using one or more of the bitstreams. The bitstreams are selected based upon the capabilities of the user equipment to decode the video signal. For example, if the user equipment is capable of receiving low resolution MPEG-2 signals having 24-bit color depth and a 10 fps frame rate, the NID selects bitstreams that have the elements of a low resolution bitstream, a 24-bit color depth and a 10 fps frame rate. The selected elements are combined to form an MPEG-2 compliant bitstream having the required color depth and frame rate. The compliant bitstream is coupled to the user equipment for decoding and presentation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
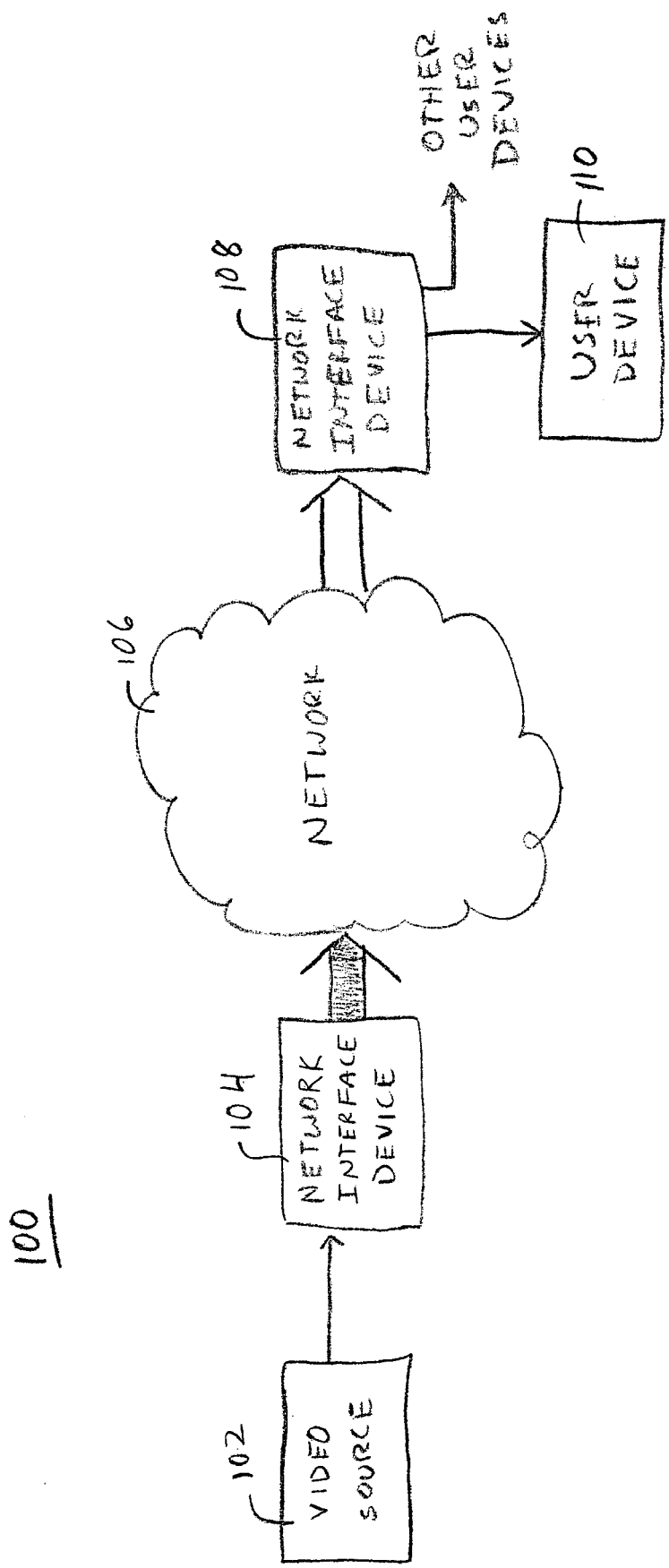
FIG. 1 depicts a block diagram of a system for generating, distributing and reconstructing deconstructed video.

FIG. 1 depicts a block diagram of a system 100 that generates, distributes and reconstructs deconstructed video. The system 100 comprises at least one network interface device (NID) 104 for generating deconstructed video, at least one NID 108 for reconstructing the video once received, and a network 106 for propagating the deconstructed video from NID 104 to NID 108. Also depicted are a source 102 of video for NID 104 and a user device 110 coupled to NID 108. These NID's generally reside at the "edge" of the network (i.e., edge NIDs) to couple content to the network or provide content to a user device or to another network. The video source can be any source that provides a sequence of image frames forming a video signal. The video signal may or may not be compressed or encoded. If encoded, the NID 104 decodes the encoded video signal and then performs a video deconstruction process. The deconstruction process, as described in detail below, may be based on any parameter, characteristic or property of the video, any characteristic or parameter of the network, or any characteristic or parameter of the user devices as well as any combination of characteristics, parameters, and properties of the system components.

The user device 110 comprises a video decoder that receives a video signal, typically an encoded video signal, from the NID 108. The NID 108 receives the deconstructed video bitstreams from the network 106 and produces a video signal that is suitable for the user device 110. The NID 108 forms, in essence, a universal video translator that translates the plurality of deconstructed video bitstreams into a signal that is suitable for processing and display by the user device 110.

In one embodiment of the invention as used in an Internet environment, the video source 102 may be a content server, the NID 104 may be a host server for a website that contains video, and the NID 108 may be a cache server in the user's "neighborhood". Such caching is well-known in the art as a way of reducing content delivery latency for highly trafficked websites. As such, the website and its video, represented in a deconstructed form, are stored in the NID 108. The deconstructed video would be selectively reconstructed depending upon the capabilities of the user device that requests the website pages.

Alternatively, in another embodiment of the invention, NID 108 can be a gateway to another network (i.e., a translation node). For example, the NID 108 may select and translate deconstructed video bitstreams into video signals having characteristics that can be transmitted through a wireless network. Or, the network may contain intermediate NIDS that reconstruct and deconstruct the bitstreams as needed to efficiently propagate the video to end users through various networks or portions of networks. A detailed description of a network having intermediate nodes, translation nodes and edge nodes is described below with reference to FIG. 7.

Figure 2:
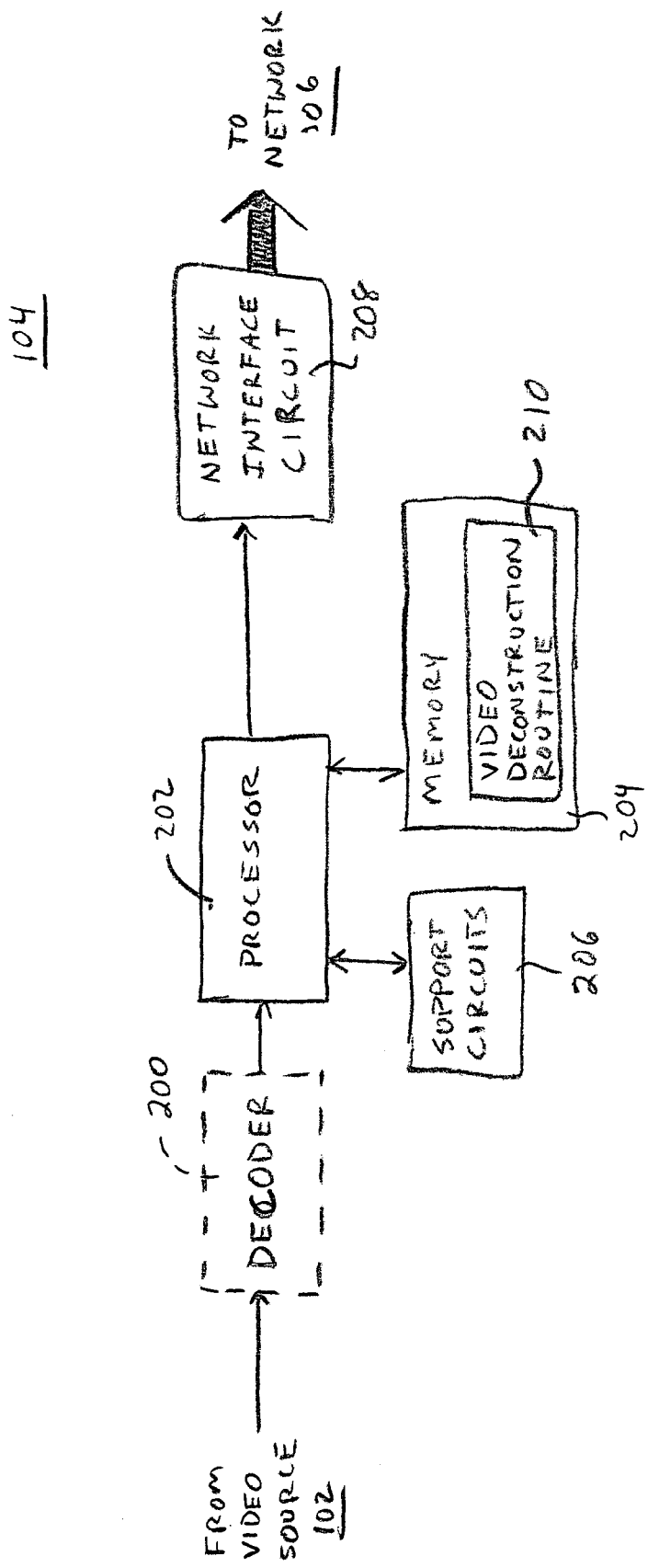
FIG. 2 depicts a block diagram of a network interface device (NID) that creates deconstructed video for transmission.
Figure 3:
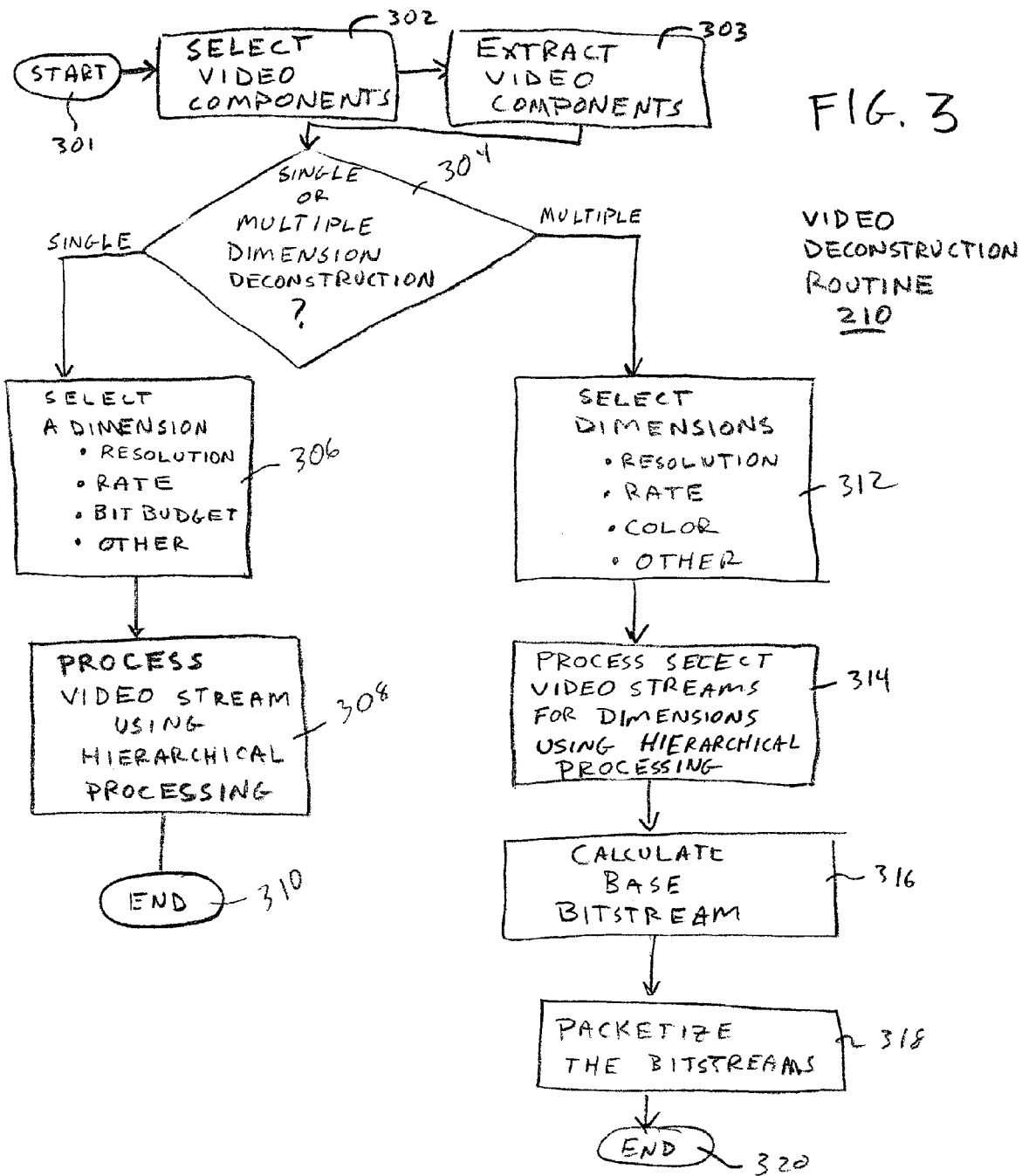
FIG. 3 depicts a flow diagram, representing the operation of the NID of FIG. 2.

FIG. 2 depicts a block diagram of the NID 104 and FIG. 3 depicts a flow diagram representing the operation of the NID 104. To best understand the operation of the NID 104, the reader should simultaneously refer to both FIGS. 2 and 3.

The NID 104 comprises an optional decider 200, a processor 202, a memory 204, processor support circuits 206, and a network interface circuit 208. The decoder 200 is only used when the video source provides encoded video such as MPEG-2 compliant video or some other compressed video sequence. The decoder 200 converts the encoded video into a sequence of video frames (also referred to as a video image sequence) where each frame comprises an array of pixels. The video image sequence is coupled to the processor 202 for image processing and video deconstruction.

The processor 202 is a general purpose processing unit, that, when executing programs that are stored in memory 204, becomes a specific purpose processor that deconstructs the video signal to form one or more deconstructed video bitstreams. Although only one processor is shown, those skilled in the art will realize that a plurality of processors may be used in parallel to perform the functions necessary to produce deconstructed video. The support circuits 206 comprise well-known circuits such as power supplies, cache, clocks, and the like that facilitate the functionality of the processor 202. The memory 204 may comprise random access memory, read only memory, flash memory, removable storage, hard disk drives, or any combination thereof. The memory 204 stores a video deconstruction routine 210 that when executed by the processor 202 causes the processor 202 to become a video deconstruction processor. The network interface circuit 208 uses a network transmission protocol, e.g., asynchronous transfer mode (ATM), to organize and transmit the deconstructed video bitstreams through the network.

Although the network interface device 104 is depicted as a general purpose computer that, when executing the software of the invention, performs the method of the invention, those skilled in the art will understand that the device 104 can be implemented using, for example, an application specific integrated circuit (ASIC).

FIG. 3 depicts a flow diagram of the video deconstruction process performed by the processor 202. The video deconstruction process performs three major subprocesses. First, the video image sequence is analyzed and divided into components with respect to characteristics in the video.

Second, a base bitstream is formed that contains video information so that any user device connected to the network can receive the base bitstream. Lastly, each component is encoded using one or more encoding dimensions to form various augmenting bitstreams that are used to enhance the base bitstreams. As such, various combinations of the base bitstream with selected ones of the augmenting bitstreams will create various video sequences having different properties.

The deconstruction process begins at step 301 and proceeds to step 302. At step 302, an operator (or an automated routine) selects the appropriate video components that are to be extracted from the video image sequence. The components that can be extracted include, but are not limited to, character recognition to differentially encode text versus moving video; face recognition to differentially encode faces versus the remaining video; motion detection to differentially encode moving objects versus stationary objects; object model encoding; encoding fixed regions differently than other regions; encoding infrared geometric shapes differently than other regions of an image; encode explicitly annotated regions differently than other regions; and chart or shape recognition to encode certain regions containing graphics different from other regions. The deconstruction method is most efficient when the extracted components are orthogonal. If the components are less then orthogonal, i.e., information from one component is contained in another component, then the deconstructed video requires more bandwidth than is used by deconstructed orthogonal components. Once selected, step 303 performs conventional component extraction to form separate video sequences containing the extracted components. Of course, the operator may select that no components be extracted.

At step 304, the routine queries whether the NID is to apply a single dimension deconstruction or a multiple dimension deconstruction to each of the components of the video image sequence. If a single dimension deconstruction is to be performed, the routine proceeds to step 306.

At step 306, the user selects a dimension to use for deconstruction. Alternatively, the NID may automatically select the dimension. These dimensions may comprise image resolution, image frame rate, encoding bit budget, color depth and the like.

The selected dimension is divided into a hierarchical structure of levels where each level represents a change in the characteristics of the selected dimension. For example, if the video image sequence was divided into two components and if the selected dimension is the resolution of the image, each level of deconstruction represents a change (e.g., an improvement) in the resolution of the image stream. Each component is represented by multiple resolution levels and a bitstream is generated for each level. As such, the video image sequences that comprise each component are subsampled to form frames of lesser resolution. This subsampling process is known as forming an image pyramid. Once a pyramid is formed for one or more of the frames of video, the various levels of the pyramid are processed to form a bitstream containing the information in each level across a plurality of video frames. For example, five levels of an image pyramid may be created for each image frame, and the first level information from each pyramid is processed to form a first bitstream (base bitstream), the second level information is formed into a second bitstream (a first augmentation bitstream), and so on until the fifth level (the highest resolution) is formed into a fifth bitstream (fourth augmentation bitstream). The dimension-based encoding is performed on a video image sequence having a plurality of extracted components, where a base bitstream is encoded using the remainder of the original video sequence after the components are extracted and then each extracted component is encoded using the dimension-based encoding. Alternatively, all the extracted components can each be dimension-based encoded without forming a single base bitstream. The bitstreams are then coupled to the network interface circuit 208 for transmission through the network to a user. Once all the video streams are processed, the routine ends at step 310.

If multidimensional deconstruction is to be performed, the routine proceeds from the query at step 304 to step 312. At step 312, the routine 210 selects a plurality of dimensions that are to be used in the deconstruction process to dimension-base encode the components of the video image sequence. These dimensions may include frame rate, resolution, black and white versus color, display type (VGA, XVGA, etc.), and the like. This list of dimensions is not considered to be exhaustive. Those skilled in the art could derive many other dimensions for encoding that are intended to fall within the scope of this invention. Any combination of these encoding dimensions could be performed by the routine to encode the video signal.

At step 314, the multidimensional encoding process processes the video stream for the selected dimensions using a hierarchical processing. This is similar to the process described earlier as embodied in step 308, but repeated for each dimension.

Once the bitstreams have been calculated for each dimension, the routine calculates, at step 316, a common base bitstream from the plurality of bitstreams calculated in step 314. This process involves calculating the common components between each of the dimensional base bitstreams, resulting in the common base bitstream being a further lower point in a partial order representation of the augmentation streams for all of the chosen dimensions. The base bitstreams of each individual dimension are now considered to be augmentation bitstreams over the common base bitstream.

Figure 4:
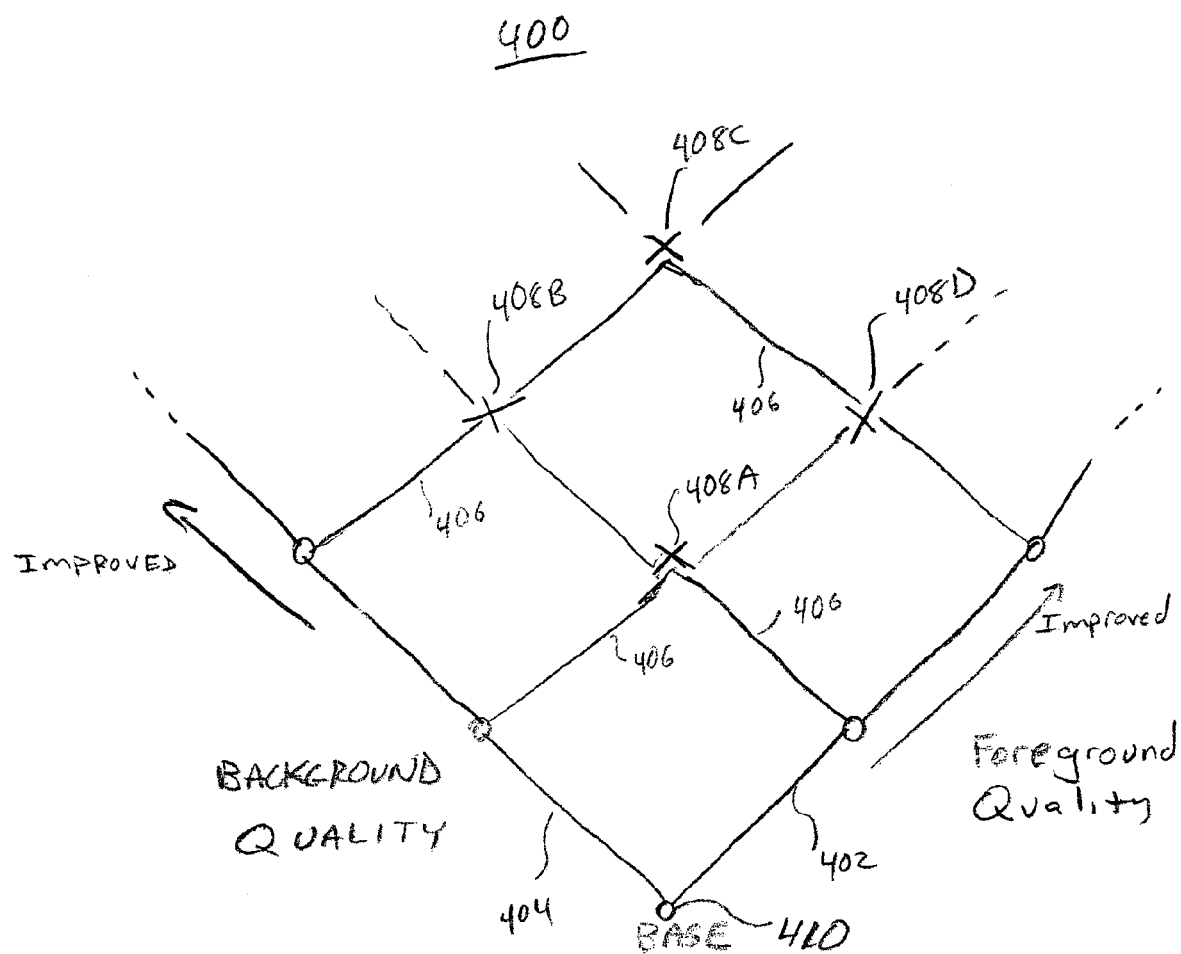
FIG. 4 depicts an illustration of a video element lattice used for generation and reconstruction of a deconstructed video bitstream.

This common base bitstream will constitute the base of a lattice (i.e., a specific partial order). FIG. 4 depicts an illustrative lattice 400 for a two dimensional encoder. In the illustration, the lattice shows a first dimension (axis 402) being the foreground quality and the second dimension (axis 404) being the background quality. The node 410 represents the common base bitstream, and nodes along axes 402 and 404 representing the augmentation bitstreams for each of the dimensions. The intersection points on the lattice (shown as an "x" 408A, 408B, 408C and so on) represent possible combinations of the base bitstream with a plurality of augmentation bitstreams to form an "improved" video image.

Note that in a more general embodiment of the current invention, there may not be a common base bitstream other than the trivial or empty bitstream. In these cases, the multi-dimensional deconstruction can be considered a partial order, and we do not transmit the (empty) common base bitstream. Also, there may not be a unique least improvement bitstream above any two given points, and again the multi-dimensional deconstruction can be considered a partial order (as opposed to lattice), and a choice is made among the points dominating a given pair of points, and the corresponding base and improvement bitstreams are selected. Each of the bitstreams (including all base bitstreams, common base bitstream and augmentation streams) are then coupled to the network interface circuit 208 for transmission onto the network 106. At step 318, the network interface circuit 208 performs the required packetization of the bitstreams and the inclusion of a packet header and other routing information to properly route the packet through the network 106. The packetization process may comply to one of many available protocols, e.g. ATM, MPEG-2, and the like. The routine 210 ends at step 320.

Although the method is described as creating a plurality of deconstructed bitstreams that together represent a video sequence, the invention may combine the various bitstreams into a one or more bitstreams in a manner similar to the use of transport streams in an MPEG-compliant transport stream.

Figure 5:
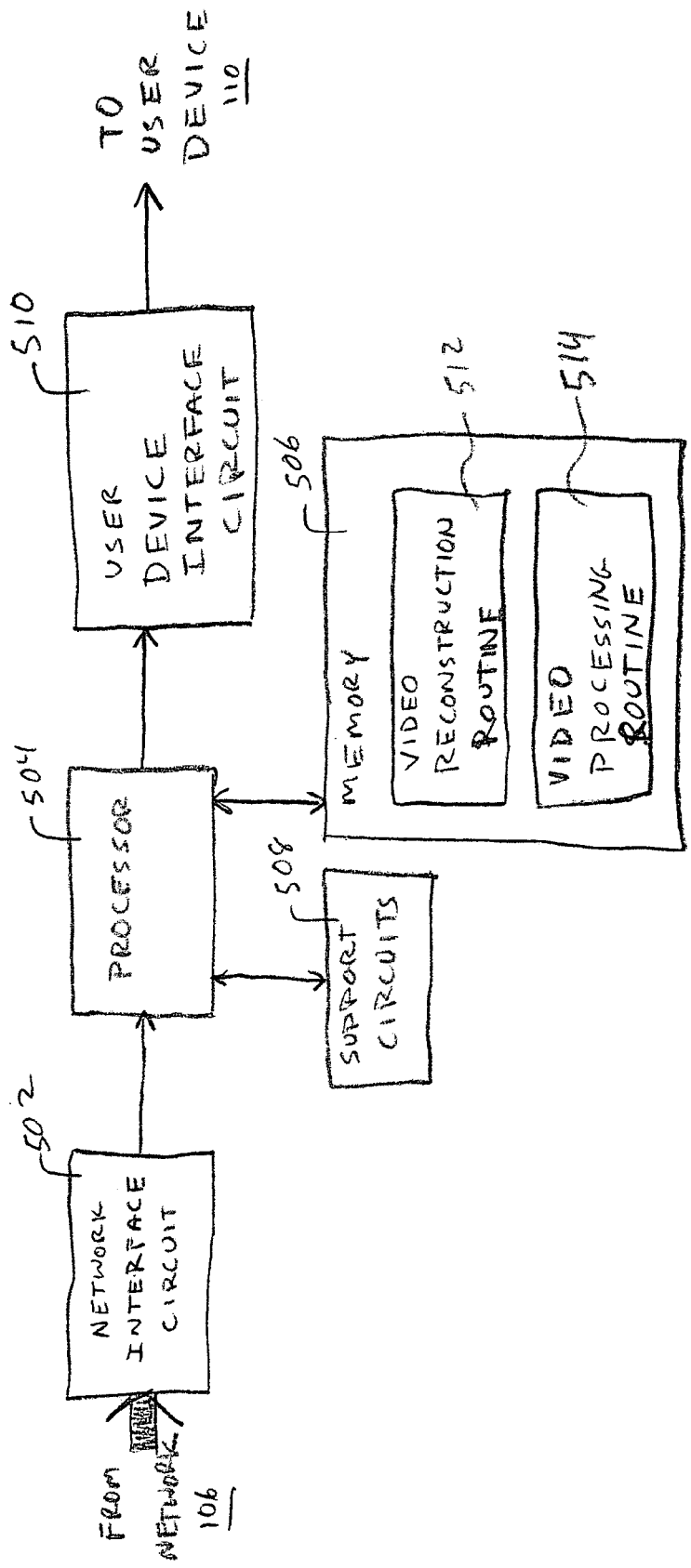
FIG. 5 depicts a block diagram of a NID that reconstructs the video sequence for a user device.
Figure 6:
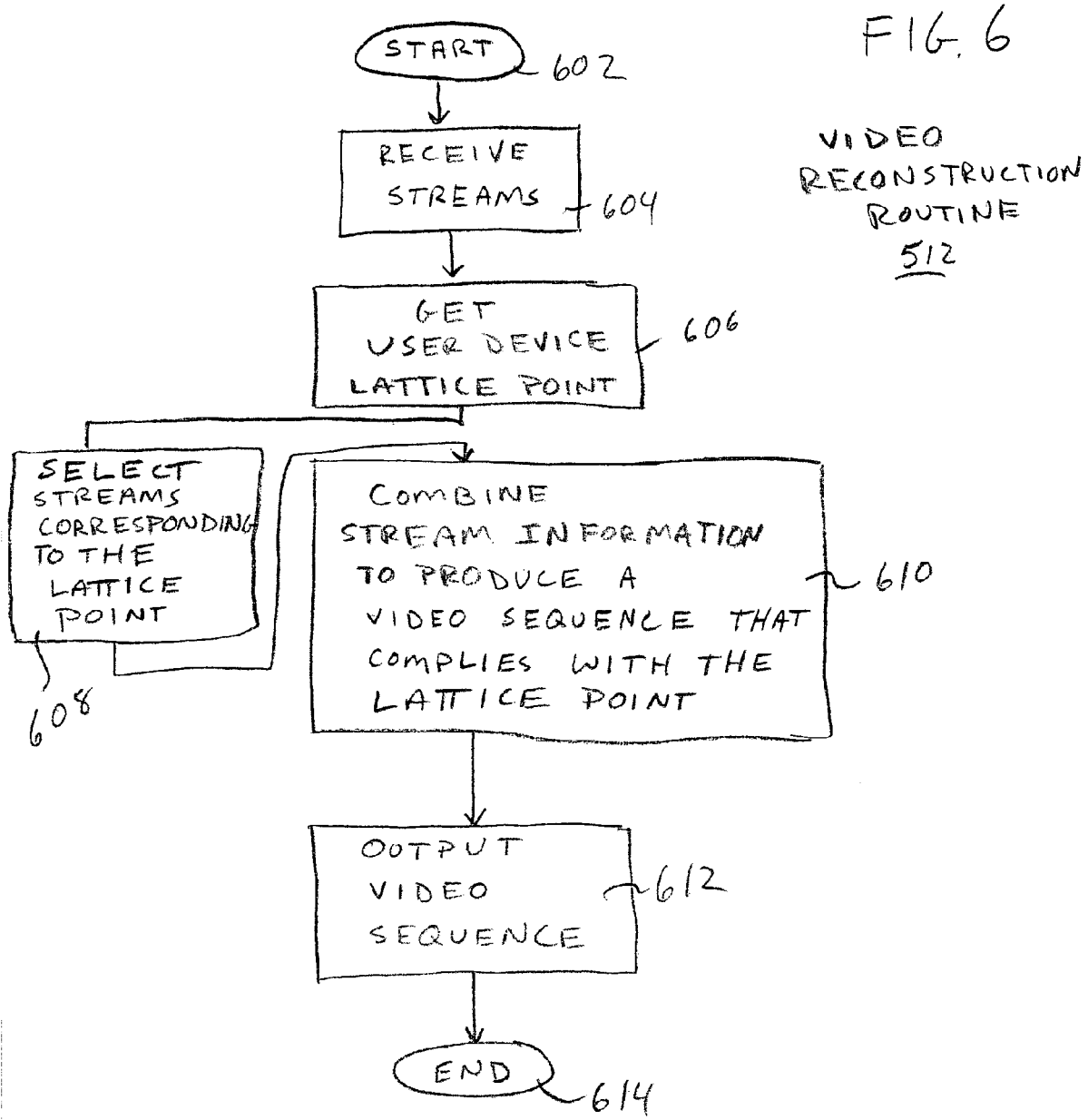
FIG. 6 depicts a flow diagram representing the operation of the NID of FIG. 4.

FIG. 5 depicts a block diagram of NID 108 and FIG. 6 depicts a flow diagram representing the operation of NID 108. NID 108 comprises a network interface circuit 502, a processor 504, a memory 506, support circuits 508 and user device interface circuits 510. The network interface circuit 502 is coupled to the network 106 to receive the bitstream(s) therefrom. The bitstreams are coupled to the processor 504 for reconstruction into a video signal. The network interface circuit receives a plurality of the bitstreams representing a particular program that have been deconstructed by the NID 104. Depending on the user device, the processor 504 selects the appropriate video bitstreams to be used for reconstruction of a video stream that is commensurate with the quality depiction capable of user device, i.e., the processor 504 selects a base bitstream plus one or more augmentation bitstreams for a particular node of the lattice.

The processor 504 is a general purpose computer that, when executing particular software, becomes a specific purpose computer. For example, the processor 504 executes video reconstruction routine 512 that is stored in memory 510 to cause the processor 504 to become a video reconstruction processor that reconstructs the video signal from selected bitstreams. Alternatively, the processor 504 may be a specific purpose computer, i.e., an application specific integrated circuit (ASIC), designed to perform video reconstruction. Further processing of the reconstructed video stream may be accomplished by the processor 504 executing the video processing routine 514. Such additional processing is used to create a video bitstream that is compliant with the user device requirements, e.g., creating an MPEG-2 compliant bitstream, a Quicktime bitstream, and the like. The reconstructed video bitstream is coupled from the processor 504 to the user device interface circuit 510. This interface circuit 510 operates in conjunction with the processor 504 to convert the video bitstream into a signal that can be used by the user device. Such a stream may be baseband video, S-video, MPEG-2 video, Quicktime video, NTSC television signals, and the like. For example, if the user device 110 were a standard television, the processor 504 generates a digital video signal (e.g., a sequence of video frames) and the circuit 510 produces a NTSC signal for reception on channel 3 of the user's television.

The NID 108 may operate as a gateway to another network such that the NID translates the deconstructed video into another form that can be distributed on a second network. This is particularly useful for a gateway that couples a wired network to a wireless network, where the wireless network has a narrower bandwidth than the wired network. As such, users of the wired network may access any lattice node while users of the wireless network may access only low quality nodes.

Alternatively, in another embodiment of the invention, the use may request (order) various grades of video content. As such, a service provider may charge various rates that are commensurate with the quality of video that is ordered.

Another alternative embodiment of the invention uses an eye tracking device that selects a region of a video display that is of most interest, i.e., the component being viewed, and the user device requests that an augmented bitstream(s) be supplied to enhance that particular region of the imagery, i.e., higher resolution can be applied to that particular portion. In lieu of an eye tracking device that requests selective enhancement in real time, the system may store an identifier of regions of most interest to a particular viewer, then, when those regions are subsequently shown again, the enhancements are applied to those regions of interest.

The video reconstruction routine 512 of FIG. 6 begins at step 602 and proceeds to step 604. At step 604, the NID 108 receives the deconstructed bitstreams from the network. At step 606, the routine 600 identifies the user device lattice point. Generally, this lattice point is provided from a lookup table such that by the model number or type of user device, the NID can identify a lattice point that is commensurate with the capabilities of the user device. The lookup table is generally populated by users registering their devices with a content provider that operates the system of the present invention. The selected lattice point defines the characteristics for the output video (and audio) that must be generated by the NID. The lattice point identifies the intersection of all the dimensions necessary to produce an appropriately formatted signal, e.g., the frame rate, the color depth, the resolution, and the like. In addition, the NID may select an available enhancement, i.e., an extracted component, to be used to augment a particular property of the video sequence.

At step 608, the streams that correspond to the lattice point (and any augmenting bitstreams) are selected as a subset of all of the bitstreams that are received by the NID. If the bitstreams are identified by different program identifiers (PIDS) in an MPEG-2 or MPEG-7 transport stream, then the selection process involves identifying the PIDS of the bitstreams that correspond to the selected lattice node. In other transport protocols, the packets of a particular bitstream may be identified by a unique header code. In either instance, the NID will then select only those bitstreams having the proper information and ignore all others. The video information is cumulative for orthogonal dimensions and components. As such, to create video of selected characteristics, the bitstreams are decoded and the resultant frames from each bitstream are added to one another.

At step 610, the information from the selected bitstreams is combined to produce a video sequence that complies with the lattice point characteristics. At step 612, the routine outputs a video sequence that is commensurate with the lattice point that was identified to match the user device. The routine ends at step 614.

Figure 7:
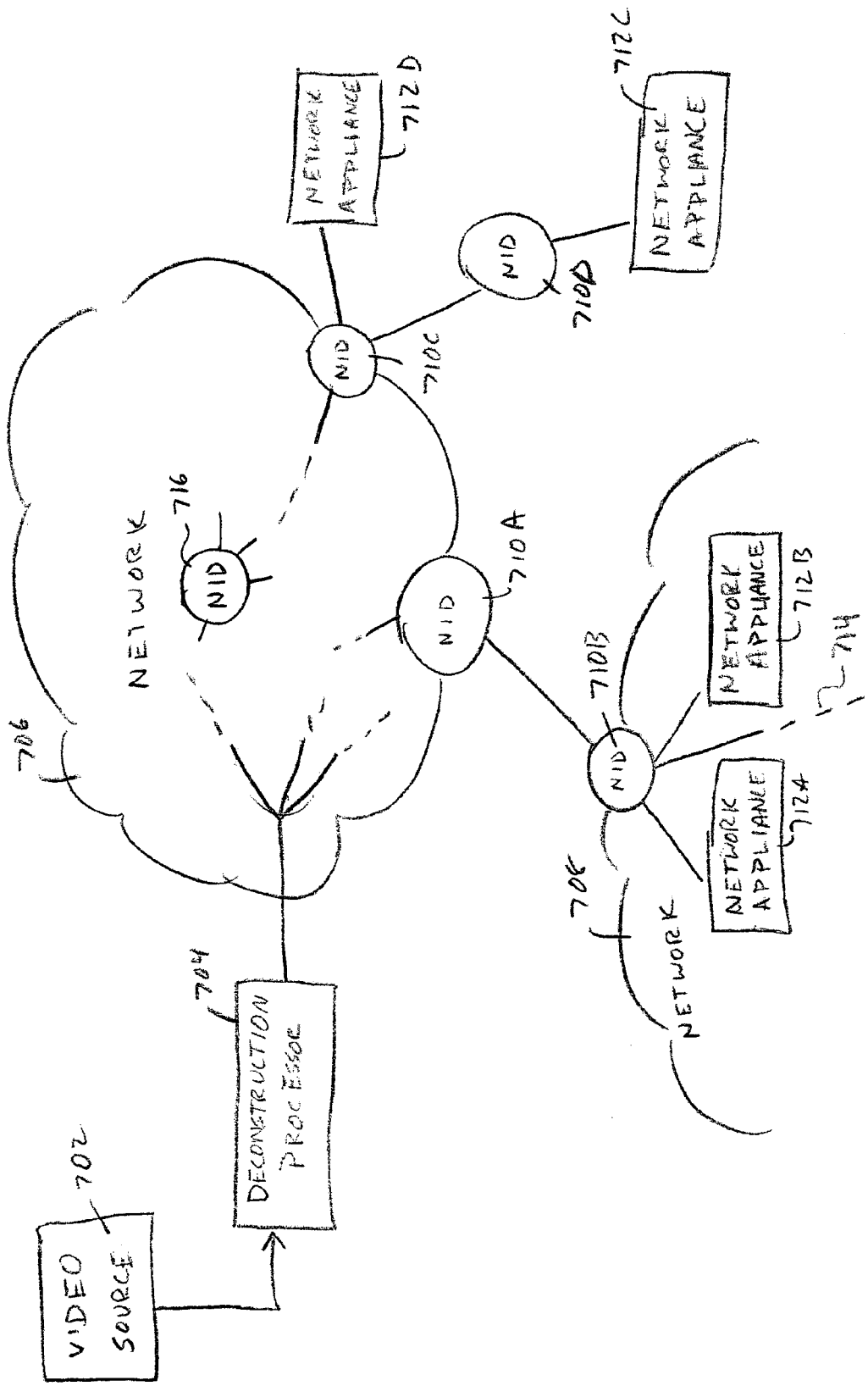
FIG. 7 depicts a block diagram of an alternative embodiment of the invention.

FIG. 7 depicts a block diagram of another embodiment of the invention comprising a video source 702, a deconstruction processor 704, a first network 706, a second network 708, a plurality of NIDs 710A, 710B, 710C and 710D and a plurality of network appliances 712A, 712B, 712C, and 712D. The network may also contain one or more intermediate NIDs 716 that perform intermediate level processing of the streams.

The video source 702 supplies a sequence of video frames to the deconstruction processor 704. The processor 704 deconstructs the video as described above to produce a plurality of bitstreams. The bitstreams are coupled to the first network 706. NIDs 710A and 710C are located at the edge of network 706 to extract content from the network 706. These NIDs 710A and 710C extract bitstreams that represent the highest quality that is required by any network appliance that is coupled to the NID 710A or 710C or any sub-NIDs. NIDs 710A and 710C form transition nodes between the two networks 706 and 708.

Sub-NIDs 710B and 710D receive bitstreams from NIDs 710A and 710C. Network appliance 712D receives bitstreams directly from NID 710C while network appliance 712C receives bitstreams from sub-NID 710D. Sub-NID 710B forms an edge interface to second network 708 comprising network appliances 712A and 712B as well as other NIDs. In this manner, NID 710A extracts bitstreams representing video having a quality that is sufficient for the network appliances in second network 708. NID 710B sends bitstreams into the network 708 on path 714 at a quality sufficient for the downstream network appliances. As such, bandwidth is conserved at each level.

NID 716 is an intermediate node within a network that performs either video deconstruction or reconstruction or some combination thereof. For example, the video source may couple directly to a broadband network and have an intermediate node within the network deconstruct the video rather than have the deconstruction on the edge of the network. Within the network, one or more other intermediate nodes may further deconstruct one or more deconstructed bitstreams or may reconstruct the video for deconstruction at another node. Within the network any number of intermediate nodes may perform various combinations of deconstruction and reconstruction of the various bitstreams.

In another embodiment of the invention, the NID may form a "headend" for a content delivery network such as cable television. As such, multiple users may be transmitted the same programs in the same format broadcast to them via a cable network. Thus, a single output from NID 108 may be coupled to a plurality of user devices.

The present invention, as described above, produces from a single video sequence from a plurality of bitstreams that are formed in a hierarchical structure such that subsets of the bitstreams may be combined to produce a video sequence that is useful to a user device. As such, the video sequence can be matched to the capabilities of the video processor of the user device.

The invention has been described, by way of illustration, in various embodiments in which the selection of bitstreams is based at least partly on the capabilities of user display devices. However, as will be clear to practitioners of the art in light of the teachings herein, other embodiments are also possible and suggested, such as embodiments and applications in which selection of bitstreams is based upon a user's desire for image quality, perhaps differentiated across various aspects of an image or images (e.g., perhaps faces or other particular portions of images might be sent at higher quality if users so desired, etc.).

Although various embodiments which incorporate the teachings of the present invention have been shown and described in detail herein, those skilled in the art can readily devise many other varied embodiments that still incorporate these teachings.

What is claimed is:

1. A method of deconstructing video comprising:
   separating a video image sequence into two or more components;
   selecting a plurality of dimensions, where each dimension represents a characteristic of the video image sequence; and
   encoding each component of the video image sequence in accordance with the selected dimensions to form a plurality of bitstreams, such that the plurality of bitstreams forms a partial order wherein each point of the partial order represents a unique valid combination of components and dimensions for encoding the video image sequence, and a base of the partial order represents a base bitstream comprising components that are common to each of said plurality of bitstreams, said base bitstream encoding a first version of said video image sequence.

2. The method of claim 1 wherein said encoding step comprises:
   forming the base bitstream representing a first video image sequence having a first set of characteristics; and
   forming at least one additional bitstream, where each additional bitstream represents a different dimension and wherein when said base bitstream and said at least one additional bitstream are combined to form a combined bitstream, the combined bitstream represents a reconstructed video image sequence having different characteristics than said first video image sequence.

3. The method of claim 1 wherein said plurality of dimensions comprise at least one of specific image regions, frame rate, resolution, and color depth.

4. The method of claim 1 wherein each of said two or more components is encoded as at least one additional bitstream.

5. The method of claim 1 wherein all of said two or more components are orthogonal relative to each other.

6. The method of claim 1 wherein said method is performed at the edge of a network.

7. The method of claim 1 wherein said method is performed at an intermediate node within a network.

8. The method of claim 7 wherein an intermediate node performs one or more functions selected from reconstruction, deconstruction, or a combination of deconstruction and reconstruction.

9. The method of claim 1 wherein, after encoding, each of said two or more components is represented by a base bitstream and at least one additional bitstream.

10. The method of claim 9 wherein said base bitstream represents a first video image sequence having minimal quality.

11. The method of claim 10 wherein said at least one additional bitstream, when combined with said base bitstream, represents a second video image sequence having a quality that is higher than said base bitstream.

12. Apparatus for producing deconstructed video comprising:
   a video component extractor for extracting at least one second image sequence from a first image sequence, where said at least one second image sequence represents a component of said first video image sequence;
   an encoding dimension selector for selecting a plurality of dimensions to use to encode said at least one second image sequence; and
   a dimension-based encoder, coupled to said encoding dimension selector, for encoding the at least one second video image sequence into a plurality of bitstreams, such that the plurality of bitstreams forms a partial order wherein each point of the partial order represents a unique valid combination of dimensions for encoding the first image sequence and the at least one second image sequence, and a base of the partial order represents a base bitstream comprising components that are common to each of said plurality of bitstreams, said base bitstream encoding a first version of said video image sequence.

13. The apparatus of claim 12 wherein the dimensions are orthogonal.

14. The apparatus of claim 12 wherein the components comprise foreground, background, and moving objects.

15. The apparatus of claim 12 wherein the dimensions comprise resolution, frame rate, and color.

16. A computer readable medium containing software that, when executed by one or more general purpose computers operating as network nodes, causes the computer or computers to perform a method comprising:

separating a video image sequence into two or more components;

selecting a plurality of dimensions, where each dimension represents a characteristic of the video image sequence; and encoding each component of the video image sequence in accordance with the selected dimensions to form a plurality of bitstreams, such that the plurality of bitstreams forms a partial order wherein each point of the partial order represents a unique valid combination of components and dimensions for encoding the video image sequence, and a base of the partial order represents a base bitstream comprising components that are common to each of said plurality of bitstreams, said base bitstream encoding a first version of said video image sequence.

17. The method of claim 16 wherein said encoding step comprises:

forming the base bitstream representing a first video image sequence having a first set of characteristics; and forming at least one additional bitstream, where each additional bitstream represents a different dimension and wherein when said base bitstream and said at least one additional bitstream are combined to form a combined bitstream, the combined bitstream represents a reconstructed video image sequence having different characteristics than said first video image sequence.

18. The method of claim 16 wherein said plurality of dimensions comprise at least one of specific image regions, frame rate, resolution, and color depth.

19. The method of claim 16 wherein each of said components is encoded as at least one additional bitstream.

20. The method of claim 16 wherein all of said two or more components are orthogonal relative to each other.

21. The method of claim 16 wherein said method is performed at the edge of a network.

22. The method of claim 16 wherein, after encoding, each of said two or more constituent components is represented by a base bitstream and at least one additional bitstream.

23. The method of claim 22, wherein said at least one additional bitstream represents a dimension of said video image sequence.

24. The method of claim 17 wherein said base bitstream represents a first video image sequence having minimal quality.

25. The method of claim 24 wherein said at least one additional bitstream, when combined with said base bitstream, represents a second video image sequence having a quality that is higher than said base bitstream.

* * * * *